(No Model.)
J. B. WILCOX.
BEE HIVE.
No. 419,809. Patented Jan. 21, 1890.
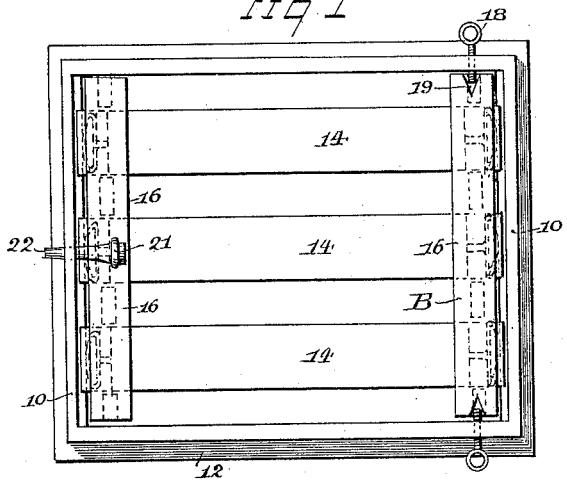
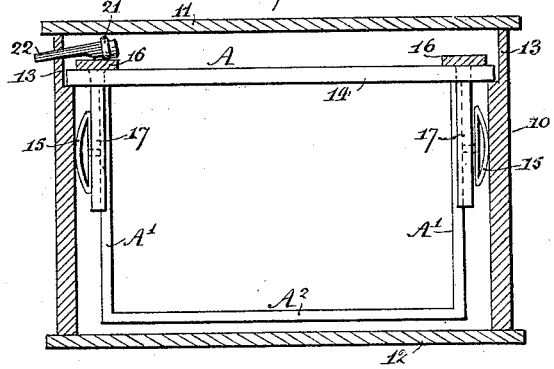
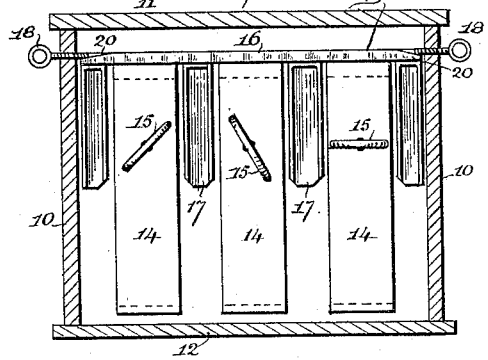
WITNESSES:
H. Walker
C. Sedgwick
INVENTOR:
J. B. Wilcox
BY Munn & Co.
ATTORNEYS.

UNITED STATES PATENT OFFICE.

JACKSON B. WILCOX, OF MANISTEE, MICHIGAN.

BEE-HIVE.

SPECIFICATION forming part of Letters Patent No. 419,809, dated January 21, 1890.

Application filed May 14, 1889. Serial No. 310,726. (No model.)

*To all whom it may concern:*

Be it known that I, JACKSON BARNARD WILCOX, of Manistee, in the county of Manistee and State of Michigan, have invented a new and useful Improvement in Bee-Hives, of which the following is a full, clear, and exact description.

My invention relates to an improvement in bee-hives, and has for its object to provide a means whereby a hive carrying movable comb-frames and provided with a removable bottom may be converted into an invertible hive in a simple and expeditious manner.

The invention consists in the novel construction and combination of the several parts, as will be hereinafter more fully set forth, and pointed out in the claims.

Reference is to be had to the accompanying drawings, forming a part of this specification, in which similar letters and figures of reference indicate corresponding parts in all the views.

Figure 1 is a plan view of a hive with the cover removed and having a removable bottom, illustrating my improvement as applied thereto and the comb-frames as held in position by thumb or set screws entering the sides of the hive. Fig. 2 is a vertical section taken between two opposed comb-frames, illustrating a modified form of retaining the said frames in position within the hive; and Fig. 3 is a vertical section taken at a right angle to the section illustrated in Fig. 2.

In carrying out the invention the hive 10 may be made of any desired contour, preferably, however, rectangular, being provided with a removable cover 11 and a detachable bottom 12. In the inner face of two opposed walls of the hive-body, a suitable distance from the top and bottom, a recess 13 is produced, upon one end wall of each of which recesses the ends of a comb-frame 14 are supported when said frames are introduced into the hive. The comb-frames 14 are preferably rectangular, consisting of a head-piece A and side pieces A', secured to the under face of the said head-piece near the ends thereof, and united at their lower ends by a base-strip A², as best illustrated in Fig. 2. Each of the comb-frames may be, if found desirable, and preferably are, provided with an adjustable knob 15 for convenience in handling the same and to avoid mashing bees between the hive and frame when removing the frame from the hive and to hold the frame in its proper position. When the several comb-frames have been introduced into the recess 13, to bear, for instance, upon the base-wall, as shown in Fig. 2, a spacing device B is introduced to extend from side to side of the hive transversely of the comb-frames over the top of the same, as illustrated in Fig. 1. These spacing devices consist of a body bar or beam 16, recessed in its inner side to receive downwardly-projecting spacing-arms 17, as illustrated in Fig. 3, which arms are preferably recessed longitudinally upon their inner faces to insure lightness in construction, and pointed at their lower ends to insure their easy introduction between the frames.

The spacing-arms are located upon the body-bar a distance apart slightly greater than the width of the upper portion of the comb-frames, and when the said spacing devices are placed in position one is located at each end of the said comb-frames contacting with the inner end wall of the hive, and one arm 17 projects downward between the side walls of the hive and the opposed comb-frame, and also between each of the intermediate comb-frames, as is also best illustrated in Fig. 3. Thus each comb-frame is held a suitable and equal distance apart. In order to rigidly secure these movable comb-frames within the hive, I may employ two or more fastening devices, two forms of which I have illustrated in the drawings.

The preferred form of fastening device is shown at the right in Fig. 1, and also in Fig. 3, and consists in passing set-screws 18 into each side of the hive to a bearing upon the base-wall of a recess 19, produced centrally in the extremity of each bar 16, or the end surfaces of said bars may be beveled, as shown at 20 in Fig. 3. By this means the spacing device is made to bear firmly upon the frames and cause the latter to be firmly seated in their recesses 13.

Another method of securing the spacing devices and comb-frames rigidly within the hive consists in securing upon the upper surface of each bar 16, at or near its center, an eye 21, as illustrated at the left in Figs. 1 and 2, and opposite each of the said eyes an aperture is produced in the end of the hive. A preferably-cylindrical wedge-block 22, enlarged at its inner end and more or less oval in general contour, is employed in connection with the eye 21, the larger or inner end of the said wedge-block being inserted in the eye and the smaller or outer end made to pass through the aperture in the hive. By turning the block, owing to its oblong shape, it secures the frame-holders securely in position. The block may be turned with the fingers by forceps or any suitable pliers. It will thus be observed that if it is necessary to invert the hive, although the comb-frames are readily removable, they are held firmly in position and properly spaced, and are not in the least disturbed when this operation is performed. By reason of the detachable bottom of the hive access may readily be had to the comb-frames.

I desire it to be understood that, although I have illustrated the hive as containing but one tier of comb-frames, two or more tiers may be introduced, if deemed advisable or desirable, and that the blocks 22 may be made of any suitable material.

Having thus described my invention, I claim as new and desire to secure by Letters Patent—

1. In a bee-hive, the combination, with a hive having a removable lid and bottom, of a series of comb-frames detachably supported in the said hive, a spacing device consisting of a body-bar and downwardly-projecting spaced arms adapted to be introduced between the several comb-frames, and a transversely-extending fastening rigidly securing the body-bar to the body of the hive, whereby the hive may be inverted and its bottom removed without disarranging the frames, substantially as set forth.

2. In a bee-hive, the combination, with a body provided with a removable lid and bottom and a recess in the inner face of each of its opposed ends or sides, of a series of comb-frames, spacing devices extending transversely of the several frames and entering the said frame-recesses, comprising a body-bar contacting with the upper surface of the said frames, and arms downwardly projected from the said body-bar between the several frames, and a lock introduced through the hive bearing upon the said spacing devices, substantially as and for the purpose specified.

3. In a bee-hive, the combination, with a body provided with a removable lid and bottom and a recess in the inner face of each of its sides, and a series of comb-frames entered in the said recesses, of a spacing device extending transversely across the several comb-frames, comprising a body-bar contacting with the upper face of the said comb-frames at or near their ends, and arms projected from the under face of the said body-bar between the sides or ends of the body of the hive and the opposed comb-frames and also between the intermediate comb-frames, and a set or thumb screw passing through the hive and bearing upon the said body-bar, all combined for operation substantially as shown and described.

4. In a bee-hive, the combination, with the hive, of a series of comb-frames supported therein, spacing devices contacting with and bearing upon the said comb-frames, comprising a body-bar and arms perpendicularly projected downward between the several comb-frames, and a set or thumb screw passing through the hive bearing upon the body-bar, substantially as shown and described, whereby the hive may be inverted when desired and the comb-frames be rigidly held within the said hive, yet rendered capable of being removed on occasion, substantially as and for the purpose specified.

JACKSON B. WILCOX.

Witnesses:
ALPHONSO TAFT,
W. J. REINEKE.